US012553957B2

(12) United States Patent
Naik et al.

(10) Patent No.: US 12,553,957 B2
(45) Date of Patent: Feb. 17, 2026

(54) SYSTEMS AND METHODS FOR TESTING A CAPACITOR IN A CIRCUIT

(71) Applicant: BorgWarner US Technologies LLC, Wilmington, DE (US)

(72) Inventors: Karthik Naik, Singapore (SG); Nomel Centino Navarro, Singapore (SG); Balasubramanian Muthuraman, Singapore (SG)

(73) Assignee: BorgWarner US Technologies LLC, Wilmington, DE (US)

( * ) Notice: Subject to any disclaimer, the term of this patent is extended or adjusted under 35 U.S.C. 154(b) by 139 days.

(21) Appl. No.: 18/405,208

(22) Filed: Jan. 5, 2024

(65) Prior Publication Data

US 2025/0224461 A1 Jul. 10, 2025

(51) Int. Cl.
*G01R 31/12* (2020.01)
*G01R 19/165* (2006.01)
(Continued)

(52) U.S. Cl.
CPC ....... *G01R 31/64* (2020.01); *G01R 19/16576* (2013.01); *H02H 7/16* (2013.01)

(58) Field of Classification Search
CPC .. G01R 19/16576; G01R 31/40; G01R 31/64; G01R 31/66; H02H 7/16; H02J 7/66
See application file for complete search history.

(56) References Cited

U.S. PATENT DOCUMENTS 2,771,992 A 11/1956 William et al.
3,521,155 A 7/1970 Zdral
(Continued)

FOREIGN PATENT DOCUMENTS

CA 1080800 A1 7/1980
CN 104635082 B 6/2017
(Continued)

OTHER PUBLICATIONS

Chen, Yang, et al. "Driving control system of deep-sea in-situ test device." 2018 IEEE International Conference on Mechatronics and Automation (ICMA). IEEE, Nov. 2018, <<https://www.researchgate.net/profile/Chen-Ming-44/publication/329306264_Driving_Control_System_of_Deep-sea_In-situ_Test_Device/links/5c00b4c292851c63cab05cb7/Driving-Control-System-of-Deep-sea-In-situ-Test-Device.pdf>>.
(Continued)

*Primary Examiner* — Thang X Le
(74) *Attorney, Agent, or Firm* — Bookoff McAndrews, PLLC

(57) ABSTRACT

Disclosed techniques relate to a system for testing a capacitor. In an example, a testing circuit includes a testing voltage source configured to output a testing voltage to the capacitor; a discharge network configured to dissipate power from the capacitor; a voltage detection circuit configured to measure a voltage of the capacitor; a first switch configured to connect the capacitor to a main circuit; a second switch configured to connect the capacitor to the discharge network; a third switch configured to connect the capacitor to the testing voltage source; and a fourth switch configured to connect the capacitor to the voltage detection circuit; and one or more controllers. The controllers are configured to control an operation of the switches to test the capacitor using the testing voltage source, the discharge network, and the voltage detection circuit, and to determine, from the test, whether the capacitor is connected.

20 Claims, 13 Drawing Sheets

(51) Int. Cl.
*G01R 31/64* (2020.01)
*H02H 7/16* (2006.01)

(56) References Cited

U.S. PATENT DOCUMENTS

| | | | |
|---|---|---|---|
| 3,714,571 A | | 1/1973 | Walker |
| 3,891,917 A | | 6/1975 | Harris |
| 4,251,767 A | | 2/1981 | Montana |
| 4,464,605 A | | 8/1984 | Ford, Jr. et al. |
| 4,835,513 A | | 5/1989 | McCurdy et al. |
| 5,294,889 A | * | 3/1994 | Heep ............... G01R 27/2605 324/676 |
| 5,798,648 A | * | 8/1998 | Ueyama ............... G01R 31/42 324/548 |
| 5,936,409 A | * | 8/1999 | Nishioka ............ G01R 31/016 324/519 |
| 6,356,086 B1 | | 3/2002 | Cook et al. |
| 6,587,050 B2 | | 7/2003 | Owen |
| 6,812,712 B2 | | 11/2004 | Linzey |
| 7,042,228 B2 | | 5/2006 | Lally et al. |
| 7,132,835 B1 | | 11/2006 | Arcus |
| 7,145,350 B2 | * | 12/2006 | Mellert ............... G01L 9/12 324/665 |
| 7,724,000 B2 | | 5/2010 | Grosjean et al. |
| 9,013,296 B2 | | 4/2015 | Clarke |
| 10,281,512 B2 | | 5/2019 | Conte et al. |
| 10,739,404 B2 | | 8/2020 | Wandres et al. |
| 11,346,893 B2 | | 5/2022 | Schnell et al. |
| 11,467,204 B2 | | 10/2022 | Nuttgens et al. |
| 2014/0167809 A1 | * | 6/2014 | Sebald ............... G01R 31/40 324/764.01 |
| 2018/0083527 A1 | | 3/2018 | Fukuda et al. |
| 2018/0198460 A1 | * | 7/2018 | Bogner ............... H03M 1/1071 |
| 2021/0325463 A1 | * | 10/2021 | Katsumata ............ B60L 3/0069 |
| 2023/0236254 A1 | | 7/2023 | Izutani et al. |
| 2023/0378879 A1 | | 11/2023 | Ammanamanchi et al. |

FOREIGN PATENT DOCUMENTS

| | | |
|---|---|---|
| CN | 109655682 B | 9/2021 |
| EP | 1742076 B1 | 4/2019 |
| GB | 1358167 A | 6/1974 |
| KR | 20180080856 A | 7/2018 |
| WO | 2008074950 A1 | 6/2008 |

OTHER PUBLICATIONS

Yin, Leyi. Formal Verification and In-Situ Test of Analog and Mixed-SignalCircuits. Dissertation. Dec. 2012, <<https://oaktrust.library.tamu.edu/bitstream/handle/1969.1/151616/Yin,%20Leyi.pdf?sequence=1>>.

Hecker, Lori A., and Hugh J. Helbert. TMI-2 Cable/connection Program: a Look atin situ Test Data. No. GEND-INF-042. EG and G Idaho, Inc., Idaho Falls, ID (United States), Dec. 1983, <<https://www.osti.gov/servlets/purl/5444806/>>.

Zhu, Ying, Wenhua H. Zhu, and Bruce J. Tatarchuk. "In-Situ Dynamic Characterization of Energy Storage and Conversion Systems." Chapter 10, Energy Storage-Technologies and Applications. IntechOpen, 2013, <<https://www.intechopen.com/chapters/42280>>.

* cited by examiner

SYSTEMS AND METHODS FOR TESTING A CAPACITOR IN A CIRCUIT

TECHNICAL FIELD

Various embodiments of the present disclosure relate generally to testing a capacitor, and more particularly, but without limitation, to systems and methods for testing a high voltage capacitor used in high voltage circuits such as a battery charging system for an electric vehicle.

BACKGROUND

Capacitors are widely used in high voltage applications, such as battery charging systems, for example, for different purposes, such as smoothing out ripples in voltages. Circuits that use capacitors can be exposed to environmental factors such as heat, cold, humidity, and impact. Due to these environmental factors, capacitors may detach from a circuit board or fail, which may result in an open circuit in the system, and thereby reducing the performance of the system.

The present disclosure is directed to overcoming one or more of these challenges.

SUMMARY OF THE DISCLOSURE

In some embodiments, the techniques described herein relate to a system including: an alternating current (AC) to direct current (DC) converter (AC-DC converter) to receive power; a DC to DC converter (DC-DC converter) connected to the AC-DC converter to charge a battery based on the received power; a noise filter including a capacitor; a testing circuit configured to test the capacitor, the testing circuit including: a testing voltage source configured to output a testing voltage to the capacitor; a discharge network configured to dissipate power from the capacitor; a voltage detection circuit configured to measure a voltage of the capacitor, as a measured voltage; a first switch configured to connect the capacitor to a main circuit; a second switch configured to connect the capacitor to the discharge network; a third switch configured to connect the capacitor to the testing voltage source; and a fourth switch configured to connect the capacitor to the voltage detection circuit; and one or more controllers configured to (i) control an operation of the first switch, the second switch, the third switch, and the fourth switch to test the capacitor using the testing voltage source, the discharge network, and the voltage detection circuit, and (ii) determine, from the test, whether the capacitor is connected to the noise filter.

In some embodiments, the techniques described herein relate to a system, further including an electric vehicle including the battery connected to the DC-DC converter.

In some embodiments, the techniques described herein relate to a system. The one or more controllers are further configured to: close the second switch, thereby connecting the capacitor to the discharge network; close the third switch, thereby applying the testing voltage to the capacitor; and close the fourth switch, thereby connecting the capacitor to the voltage detection circuit.

In some embodiments, the techniques described herein relate to a system. The one or more controllers are further configured to: determine that the measured voltage is below a threshold; and responsive to determining that the measured voltage is below the threshold, determine that the capacitor is disconnected from the noise filter.

In some embodiments, the techniques described herein relate to a system. The one or more controllers are further configured to: determine that the measured voltage is above a threshold; and responsive to determining that the measured voltage is above the threshold, determine that the capacitor is connected to the noise filter.

In some embodiments, the techniques described herein relate to a system. The one or more controllers are configured to close the first switch, thereby connecting the capacitor to the noise filter.

In some embodiments, the techniques described herein relate to a system. The one or more controllers are further configured to: open the first switch, thereby disconnecting the capacitor from the noise filter; and close the second switch, thereby connecting the capacitor to the discharge network.

In some embodiments, the techniques described herein relate to a system. The one or more controllers are further configured to: open the second switch, thereby disconnecting the capacitor from the discharge network; and close the third switch, thereby applying the testing voltage source to the capacitor.

In some embodiments, the techniques described herein relate to a system. The one or more controllers are further configured to: open the third switch, thereby disconnecting the testing voltage source from the capacitor; and close the fourth switch, thereby connecting the capacitor to the voltage detection circuit.

In some embodiments, the techniques described herein relate to a method including performing, with one or more controllers, operations including: connecting a capacitor to a discharge network; after a first time period, disconnecting the capacitor from the discharge network and applying a testing voltage to the capacitor; after a second time period, disconnecting the testing voltage from the capacitor and connecting the capacitor to a voltage detection circuit; measuring, at the voltage detection circuit, a voltage at the capacitor, as a measured voltage; comparing the measured voltage against a threshold voltage; and responsive to the comparing, determining whether the capacitor is connected or disconnected.

In some embodiments, the techniques described herein relate to a method. The operations further include: determining that the capacitor is disconnected when the measured voltage is below the threshold voltage; and determining that the capacitor is connected when the measured voltage is above the threshold voltage.

In some embodiments, the techniques described herein relate to a method. The operations further include: disconnecting the testing voltage; and subsequent to disconnecting the testing voltage, delaying the connecting of the capacitor to the voltage detection circuit for a third time period.

In some embodiments, the techniques described herein relate to a method. The operations further include: receiving, from the voltage detection circuit, additional voltage measurements at the capacitor; and detecting, based on the additional voltage measurements, a peak in the voltage at the capacitor.

In some embodiments, the techniques described herein relate to a system including: a testing circuit configured to test a capacitor, the testing circuit including: a testing voltage source configured to output a testing voltage to the capacitor; a discharge network configured to dissipate power from the capacitor; a voltage detection circuit configured to measure a voltage of the capacitor, as a measured voltage; a first switch configured to connect the capacitor to a main circuit; a second switch configured to connect the capacitor to the discharge network; a third switch configured to connect the capacitor to the testing voltage source; and a fourth switch configured to connect the capacitor to the voltage detection circuit; and one or more controllers configured to (i) control an operation of the first switch, the second switch, the third switch, and the fourth switch to test the capacitor using the testing voltage source, the discharge network, and the voltage detection circuit and (ii) determine, from the measured voltage, whether the capacitor is connected to the testing circuit.

In some embodiments, the techniques described herein relate to a system. The one or more controllers are further configured to: control the operation of the second switch to be closed, thereby connecting the capacitor to the discharge network; control the operation of the third switch to be closed, thereby applying the testing voltage to the capacitor; and control the operation of the fourth switch to be closed, thereby connecting the capacitor to the voltage detection circuit.

In some embodiments, the techniques described herein relate to a system. The one or more controllers are further configured to: determine that the measured voltage is below a threshold; and responsive to the determining that the measured voltage is below the threshold, determine that the capacitor is disconnected.

In some embodiments, the techniques described herein relate to a system. The one or more controllers are further configured to: determine that the measured voltage is above a threshold; and responsive to the determining that the measured voltage is above the threshold, determine that the capacitor is connected.

In some embodiments, the techniques described herein relate to a system. The one or more controllers are further configured to control the operation of the first switch to be closed, thereby connecting the capacitor to the main circuit.

In some embodiments, the techniques described herein relate to a system. The one or more controllers are further configured to: control the operation of the first switch to be open, thereby disconnecting the capacitor from the main circuit; control the operation of the second switch to be closed, thereby applying the capacitor to the discharge network; control the operation of the second switch to be open, thereby disconnecting the capacitor from the discharge network; control the operation of the third switch to be closed, thereby applying the testing voltage source to the capacitor; control the operation of the third switch to be closed, thereby disconnecting the testing voltage source from the capacitor; and control the operation of the fourth switch to be closed, thereby connecting the capacitor to the voltage detection circuit.

In some embodiments, the techniques described herein relate to a system, further including: a first resistor connected between the third switch and the testing voltage source; a diode connected to the fourth switch; and a second resistor connected between the fourth switch and the voltage detection circuit . . . .

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
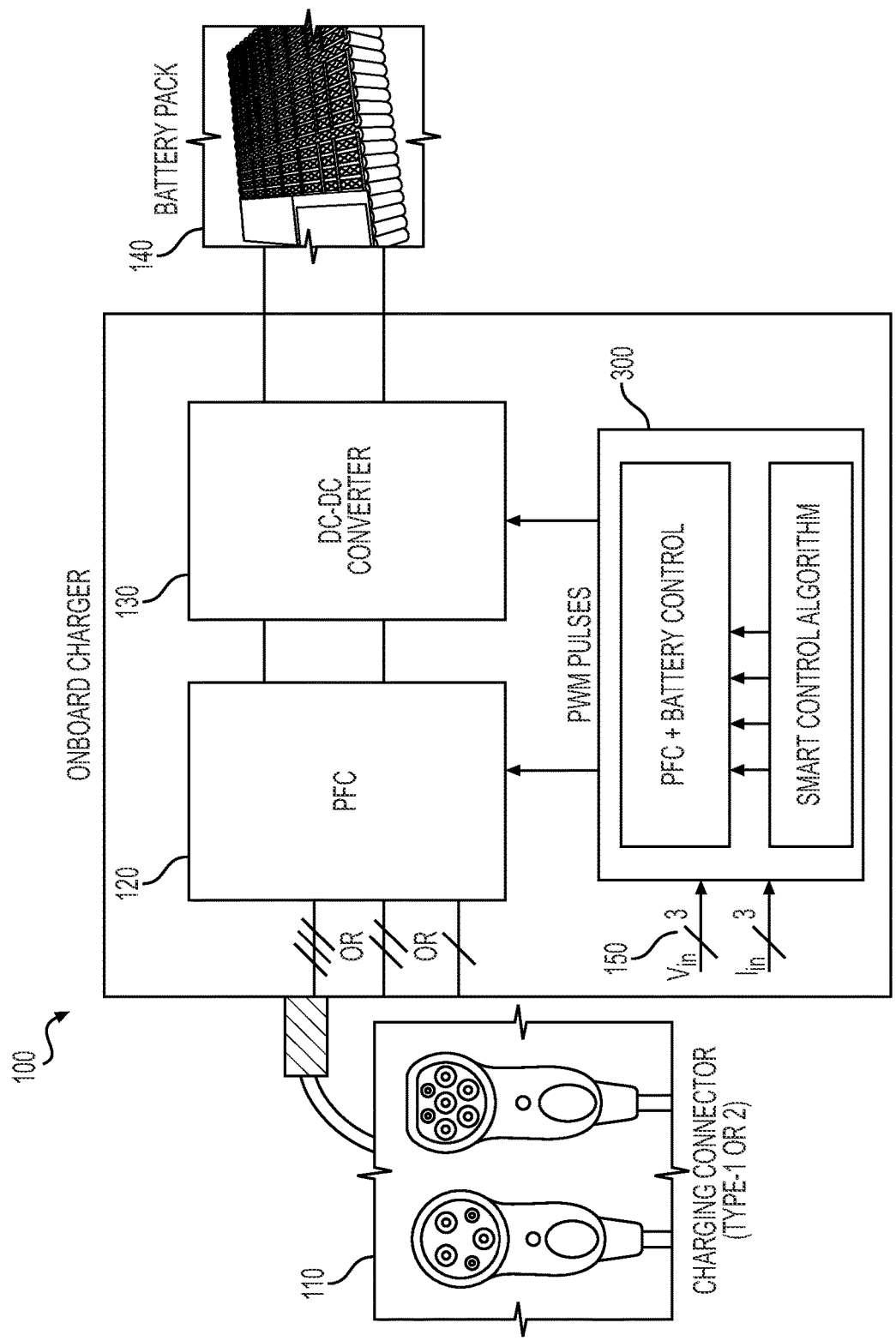
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value. In this disclosure, unless stated otherwise, any numeric value may include a possible variation of +10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to testing a capacitor, and more particularly, but without limitation, to systems and methods for testing a high voltage capacitor used in high voltage circuits such as a battery charging system for an electric vehicle.

Some testing systems lack the ability to test whether a capacitor is open and/or lack the ability to test a capacitor after the capacitor has been integrated into a circuit.

One or more embodiments may be applied to capacitors that are installed in a circuit, such as a battery charger (a "main circuit"), for example. One or more embodiments may provide a testing circuit that may temporarily disrupt a main circuit during testing, and may otherwise allow the main circuit to operate independently from the testing circuit. The testing circuit may determine whether a capacitor has become disconnected from the main circuit or is otherwise faulty.

The following non-limiting example is introduced for discussion purposes. A controller within a capacitor testing system controls various switches such that a capacitor in a main circuit is temporarily disconnected from the main circuit to facilitate testing of the capacitor and is reconnected to the main circuit when testing is complete. Various combinations of the switches may connect the capacitor to, and disconnect the capacitor from, a discharge network and connect the capacitor to, and disconnect the capacitor from, a testing voltage source. During testing, the controller disconnects the capacitor from the main circuit and discharges the capacitor via the discharge network. Following a period of discharge, the controller connects the capacitor to a power source that applies a test voltage to the capacitor. Following application of the test voltage for a period of time (e.g., a known period of time), the controller then connects the capacitor to a detection circuit. The detection circuit obtains measurements of an output voltage from the capacitor over time. As discussed further herein, from these measurements, the controller may determine whether the capacitor is properly connected to the main circuit and is functioning correctly.

Figure 3:
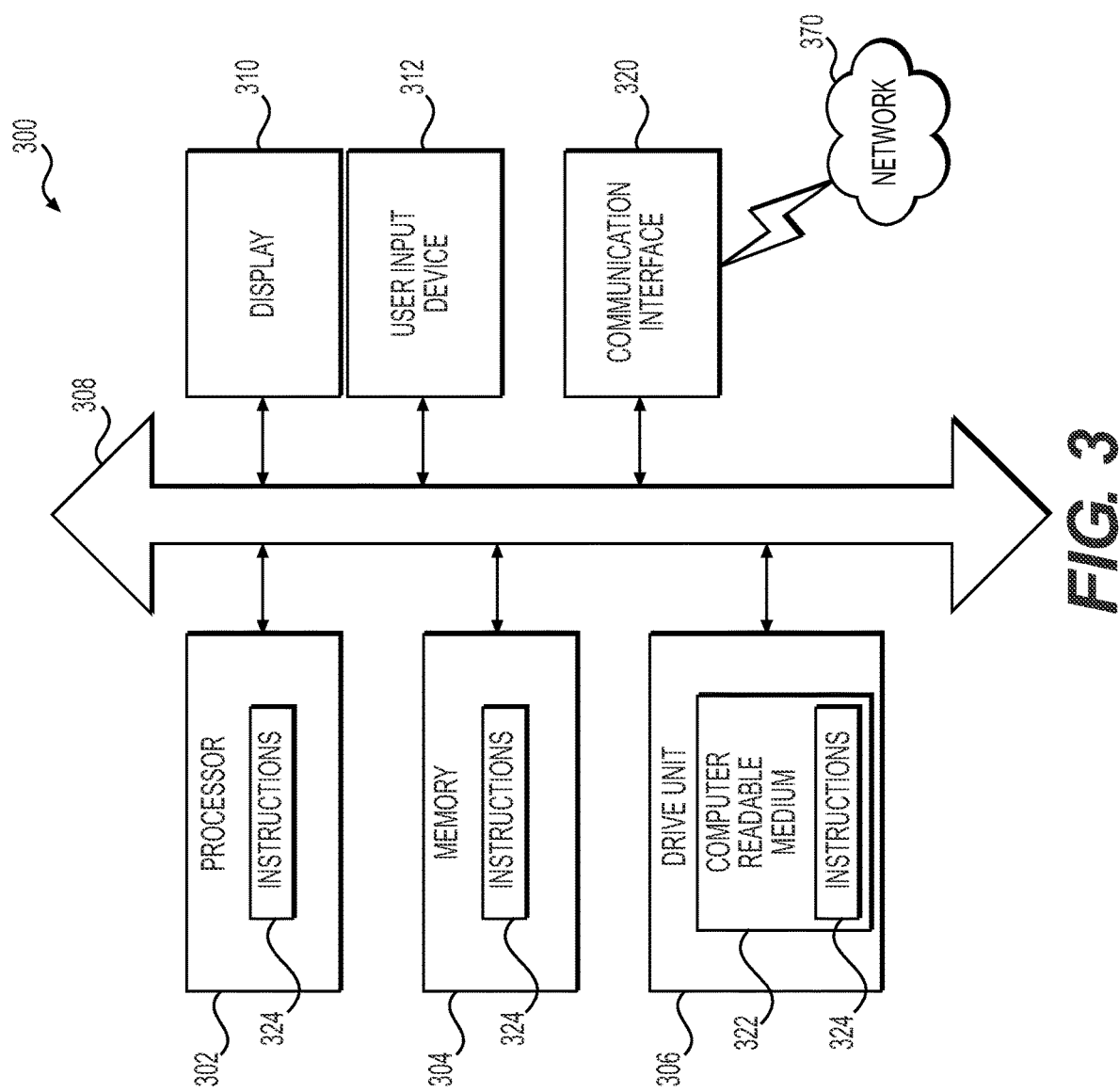
FIG. 3 depicts an implementation of a computer system that may execute techniques presented herein, according to one or more embodiments.
Figure 4:
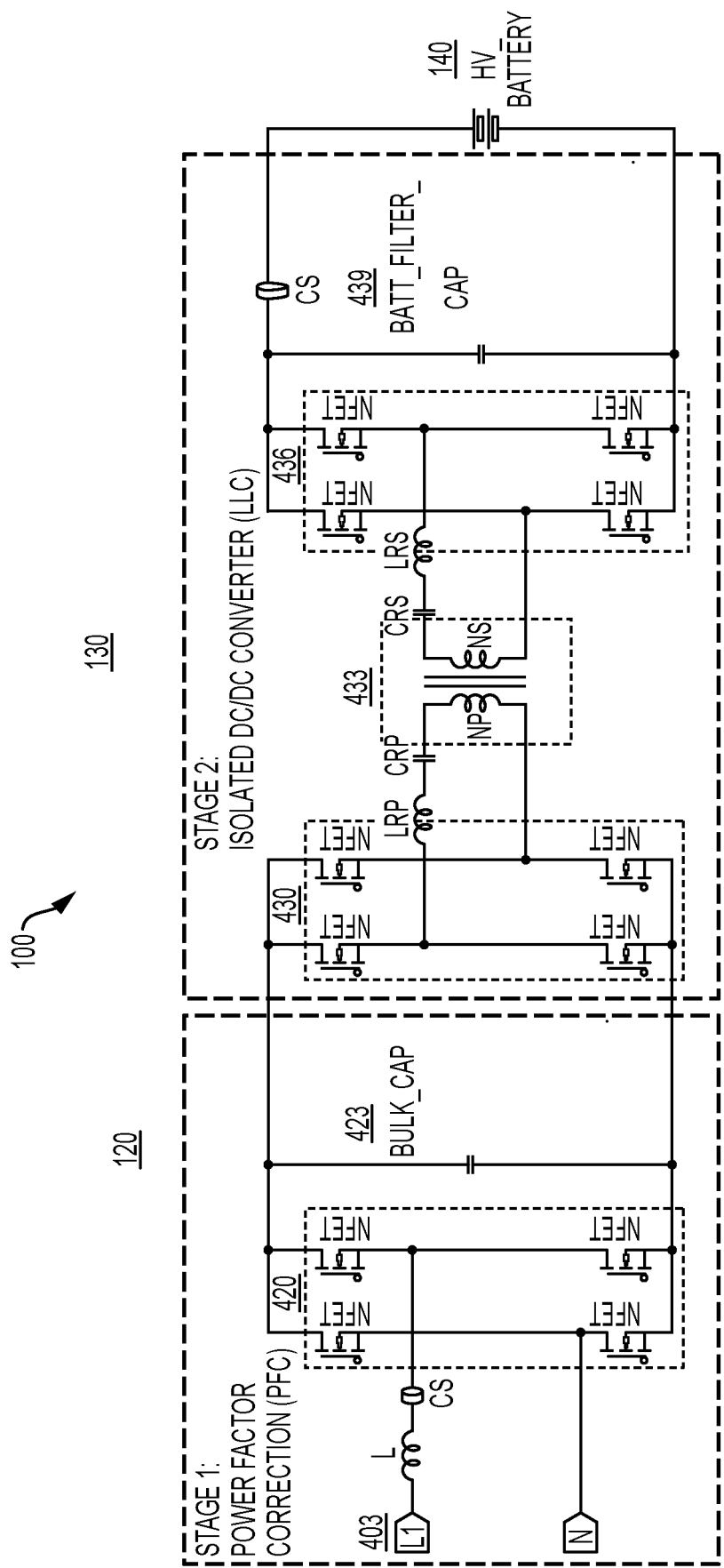
FIG. 4 depicts an exemplary electrical schematic for a single-phase battery charger with a bulk capacitor and a high voltage filter capacitor, according to one or more embodiments.
Figure 5:
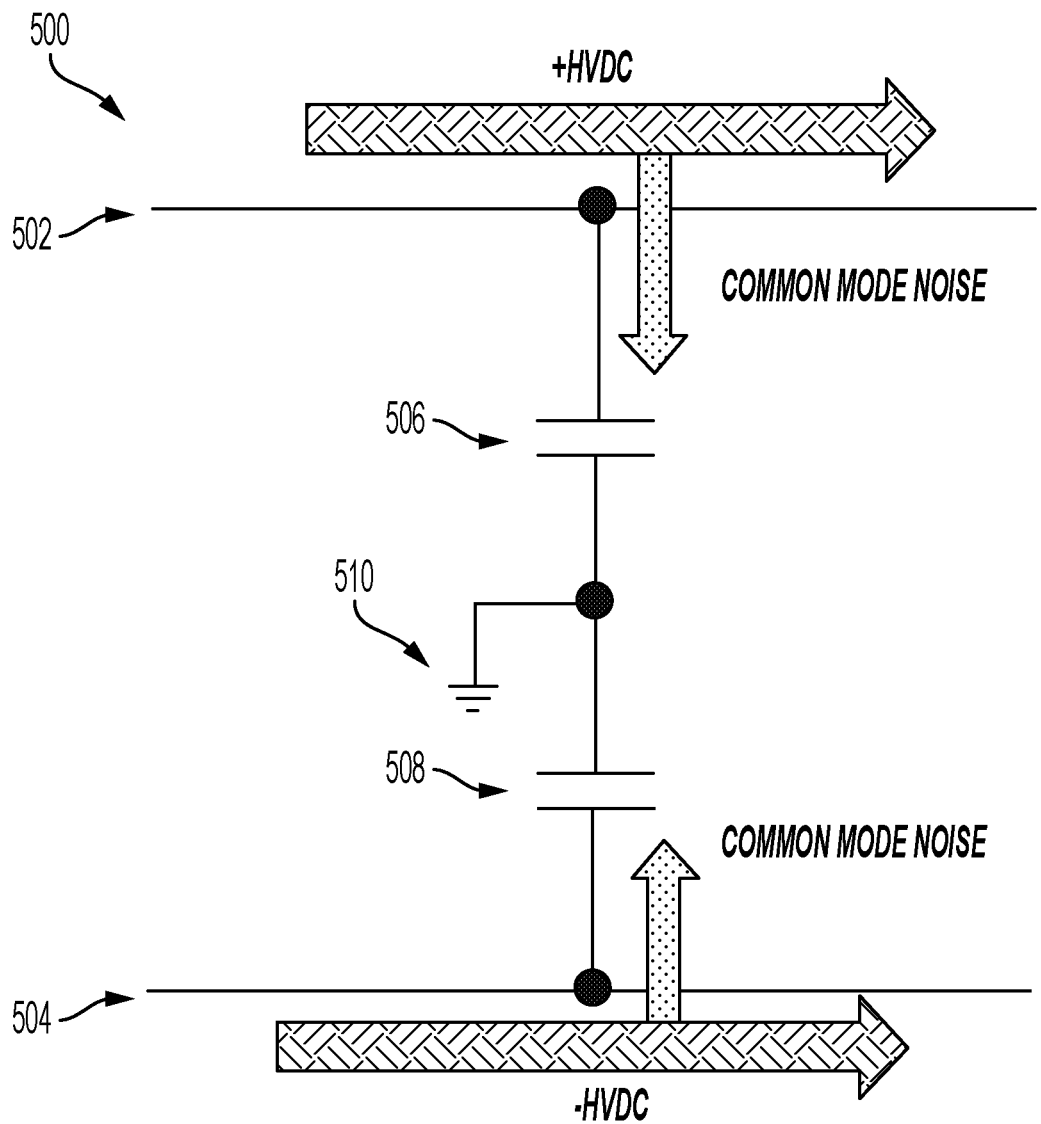
FIG. 5 depicts an exemplary electrical schematic for a noise filtering circuit, according to one or more embodiments.

While the examples discussed herein describe testing a capacitor in a battery charging circuit, as discussed with respect to FIGS. 1-4, or a noise reduction circuit as discussed with respect to FIG. 5, the disclosure is not limited thereto. Rather, one or more embodiments may provide systems and methods to test a capacitor installed in any circuit.

FIG. 1 depicts an exemplary system infrastructure for a battery charger, according to one or more embodiments. As depicted in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, an HV DC-DC converter 130, and a controller 300 receiving signals from input sensor 150. Power Factor Correction (PFC) converter 120 may be an AC-DC converter. HV DC-DC converter 130 may be a DC-DC converter. Controller 300 may include one or more controllers. The battery charger 100 may include or be electrically connectable to a battery 140. The battery charger 100 may be used in automotive vehicles as an onboard charger to transfer power from an external power source through charging connector 110 to battery 140 in a grid-to-battery operation, or to transfer power from battery 140 in a vehicle to grid configuration (a battery-to-grid operation). The battery charger 100 may be included in a system provided as an electric vehicle including a motor configured to rotate based on power received from the battery 140.

Figure 2:
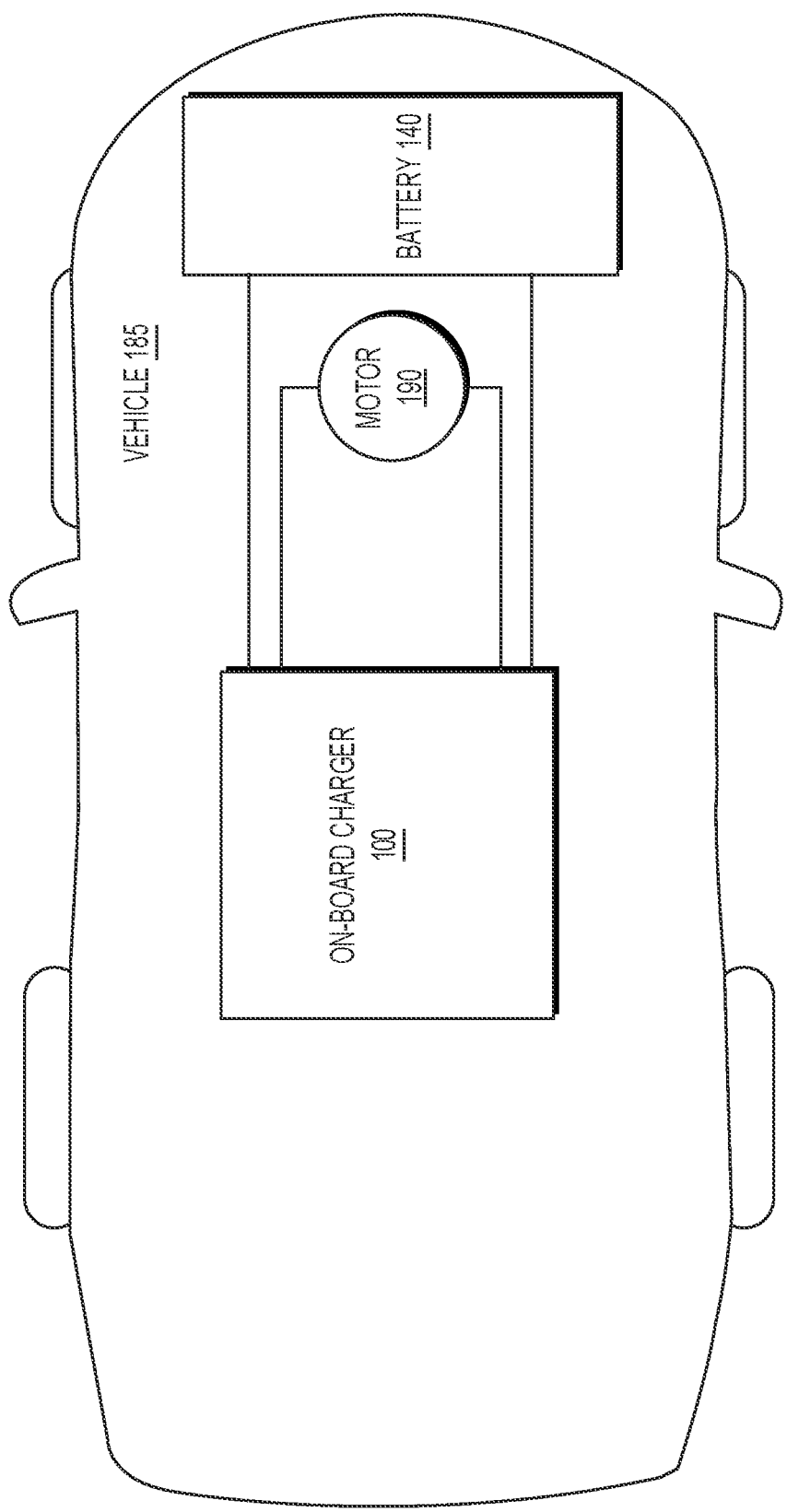
FIG. 2 depicts an exemplary system infrastructure for a vehicle including a battery charger, according to one or more embodiments.

FIG. 2 depicts an exemplary system infrastructure for a vehicle including a battery charger, according to one or more embodiments. The battery charger 100 may be a combined inverter and converter. As depicted in FIG. 2, electric vehicle 185 may include battery charger 100, motor 190, and battery 140. Battery charger 100 may include components to receive electrical power from an external source and output electrical power to charge battery 140 of electric vehicle 185. Battery charger 100 may convert DC power from battery 140 in electric vehicle 185 to AC power, to drive motor 190 of the electric vehicle 185, for example, but the embodiments are not limited thereto. For example, battery charger 100 may include components to receive electrical power from an external source and output electrical power to charge battery 140 without motor 190 connected to battery charger 100. Battery charger 100 may convert DC power from battery 140 in electric vehicle 185 to AC power, to drive AC components other than motor 190 of the electric vehicle 185. Battery charger 100 may be bidirectional, and may convert DC power to AC power, or convert AC power to DC power, such as during regenerative braking, for example. Battery charger 100 may be a three-phase inverter, a single-phase inverter, or a multi-phase inverter.

FIG. 3 depicts an implementation of a controller 300 that may execute techniques presented herein, according to one or more embodiments. For example, controller 300 may control the capacitor testing circuits discussed further with respect to FIGS. 6A-6E. Additionally or alternatively, controller 300 may be used to control the battery charging circuits discussed with respect to FIGS. 1, 2, and 4. In some cases, controller 300 may operate as a detection circuit for a voltage of a capacitor under test. For example, in low voltage testing applications, a capacitor under test may be connected to an input of controller 300 during a discharge phase of testing, as discussed further with respect to FIGS. 5-7.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, embodiments of the present disclosure are described in the context of computer-executable instructions, such as routines executed by a data processing device, e.g., a server computer, wireless device, and/or personal computer. Those skilled in the relevant art will appreciate that embodiments of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Embodiments of the present disclosure may be embodied in a special purpose computer and/or data processor that is specifically programmed, configured, and/or constructed to perform one or more of the computer-executable instructions explained in detail herein. While embodiments of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Embodiments of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under embodiments of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As depicted, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

FIG. 4 depicts an exemplary electrical schematic for a single-phase battery charger with a bulk capacitor and a high voltage filter capacitor, according to one or more embodiments. As depicted in FIG. 4, battery charger 100 may include PFC converter 120 and HV DC-DC converter 130. PFC converter 120 may be connected to line voltage 403, which may be a single-phase voltage, for example. HV DC-DC converter 130 may be connected to battery 140. HV DC-DC converter 130 may be operable to isolate PFC converter 120 from battery 140. For example, HV DC-DC converter 130 may be a CLLLC converter, or any suitable DC-DC converter. A bulk capacitor and/or a high voltage filter capacitor may be tested using the techniques described herein, for example, with respect to FIGS. 6A-E and 7.

PFC converter 120 may include PFC converter switch 420 and bulk capacitor 423. PFC converter switch 420 may be one or more switches, such as four NFET switches, for example, as depicted in FIG. 4. PFC converter 120 may include other components, such as inductor L, and current sensor CS, for example. Bulk capacitor 423 may be tested using the techniques described herein.

HV DC-DC converter 130 may include bridge driver switch 430, one or more transformers 433, bridge rectifier switch 436, and HV filter capacitor 439. HV filter capacitor 439 may be tested using the techniques described herein. Bridge driver switch 430 may be one or more switches, such as four NFET switches, for example, as depicted in FIG. 4. Bridge rectifier switch 436 may be one or more switches, such as four NFET switches, for example, as depicted in FIG. 4. PFC converter 120 may include other components, such as primary side inductor LRP, secondary side inductor LRS, primary side capacitor CRP, secondary side capacitor CRS, and current sensor CS, for example.

The battery charger 100 may operate bi-directionally. A vehicle to grid (V2G) configuration may be achieved with a designed control strategy for multiple voltages. The PFC converter 120 may be configured to receive DC power from battery 140 through HV DC-DC converter 130, convert the DC power to AC power, and provide the AC power as an output to line voltage 403. The controller 300 may be designed with an algorithm to control an operation of the PFC converter 120 and HV DC-DC converter 130.

Bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 420, bridge driver switch 430, and bridge rectifier switch 436.

FIG. 5 depicts an exemplary electrical schematic for a noise filter circuit 500, according to one or more embodiments. In the example depicted in noise filter circuit 500, two capacitors are used to filter noise on a positive voltage rail and/or a negative voltage rail.

As depicted, noise filter circuit 500 includes positive voltage rail 502, negative voltage rail 504, first capacitor 506, second capacitor 508, and ground 510. As depicted, first capacitor 506 is connected to positive voltage rail 502, second capacitor 508 is connected to negative voltage rail 504, and both first capacitor 506 and second capacitor 508 are both connected to ground 510. In some embodiments, some components of noise filter circuit 500 may be omitted and/or other components added to noise filter circuit 500.

Noise may be introduced into the system and carried on one or more of positive voltage rail 502 or negative voltage rail 504. In the example depicted, first capacitor 506 and second capacitor 508 may reduce the noise on the positive voltage rail 502 and/or negative voltage rail 504. For example, first capacitor 506 and second capacitor 508 may filter high frequency noise that may have coupled with the high voltage on positive voltage rail 502, thereby reducing EMI/RFI noise and the related side effects.

In some cases, first capacitor 506 and second capacitor 508 may be safety certified capacitors. Such capacitors are useful in the case that high voltages are used in the circuit, for instance, as may be the case with battery charging circuits. First capacitor 506 and second capacitor 508 may be tested using techniques disclosed herein such as, for example, by using the circuits depicted in FIGS. 6A-6E. In some cases, capacitors such as first capacitor 506 and second capacitor 508 may become disconnected from a main circuit (e.g. one or more of positive voltage rail 502, negative voltage rail 504, or ground 510) due to impact or vibration.

Capacitor testing may occur during or after purposeful impact or vibration testing. For example, impact and vibration testing may be performed with systems that include circuits such as noise filter circuit 500, as such systems may be designed to have a high tolerance for the effects of impact and vibration.

In an example, testing may be performed such that vibration tests are performed at 5 G-force (force per unit mass) every 10 minutes, with increasing force until the vibration reaches 25 G-force. By using the techniques described herein, systems may be designed such that capacitor testing capability is integrated. In this manner, during or after such testing, a determination may be made as to whether the capacitors are still connected and functioning, without needing to remove a protective covering.

FIGS. 6A-6E depict an exemplary electrical schematic for a capacitor testing circuit 600 in various configurations, according to one or more embodiments. In the example depicted, testing is performed on capacitor 606 to determine whether capacitor 606 has become disconnected from the main circuit. Reasons for disconnection include capacitor 606 being physically separated from the circuit, and capacitor 606 being otherwise non-functional.

More specifically, capacitor testing circuit 600 includes positive voltage rail 602, capacitor 606, ground 610, first switch (S1) 611, second switch (S2) 612, third switch (S3) 613, fourth switch (S4) 614, first resistor 620, second resistor 622, diode 624, power source 626, discharge network 630, and detection circuit 632.

Capacitor 606 may correspond to first capacitor 506 of noise filter circuit 500. However, capacitor 606 may be any capacitor. For example, capacitor 606 may correspond to second capacitor 508 of noise filter circuit 500, or may correspond to another capacitor in another circuit.

Figure 6A:
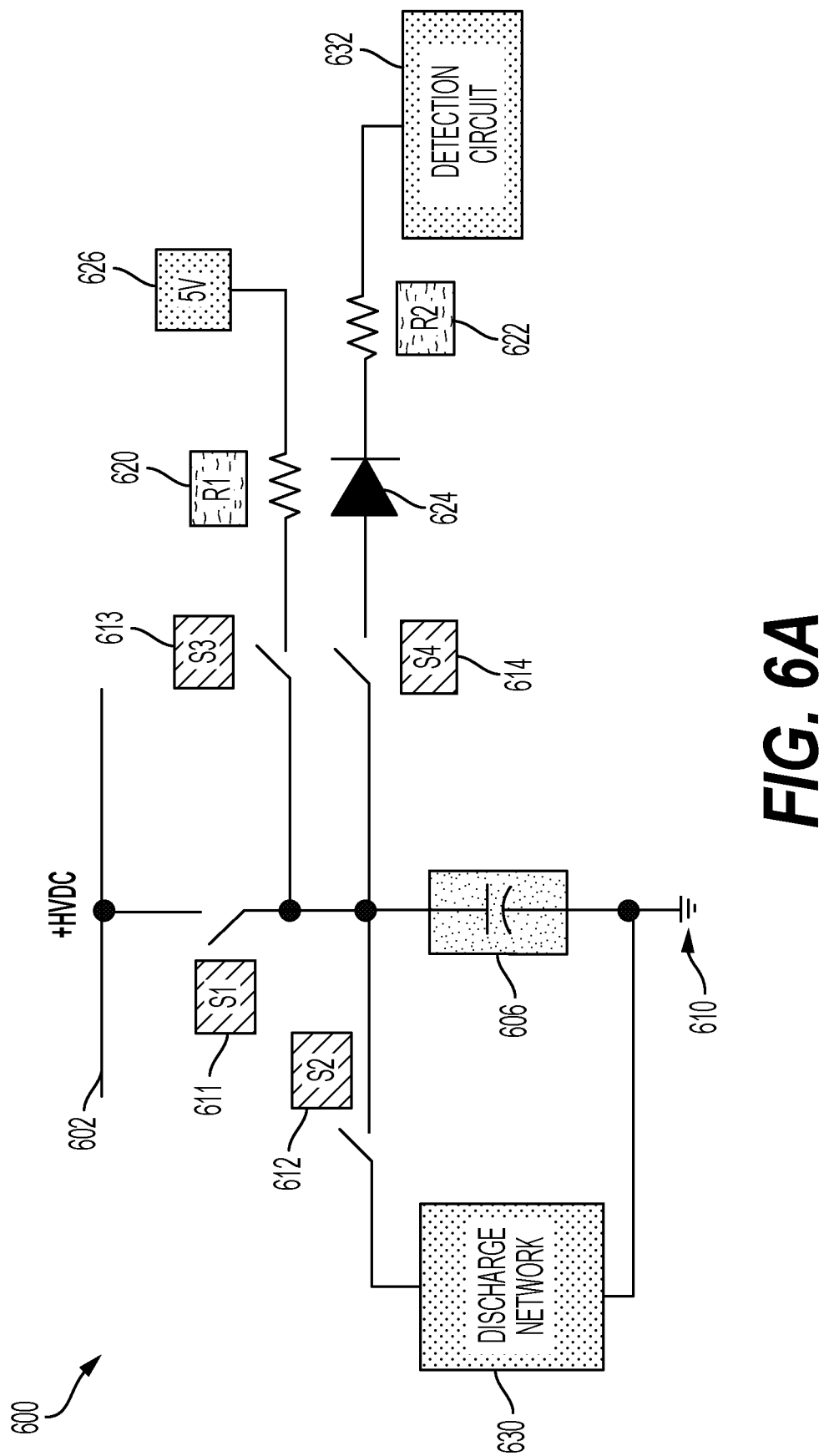
FIG. 6A, FIG. 6B, FIG. 6C, FIG. 6D, and FIG. 6E depict an exemplary electrical schematic for a capacitor testing circuit in various configurations, according to one or more embodiments.
Figure 6B:
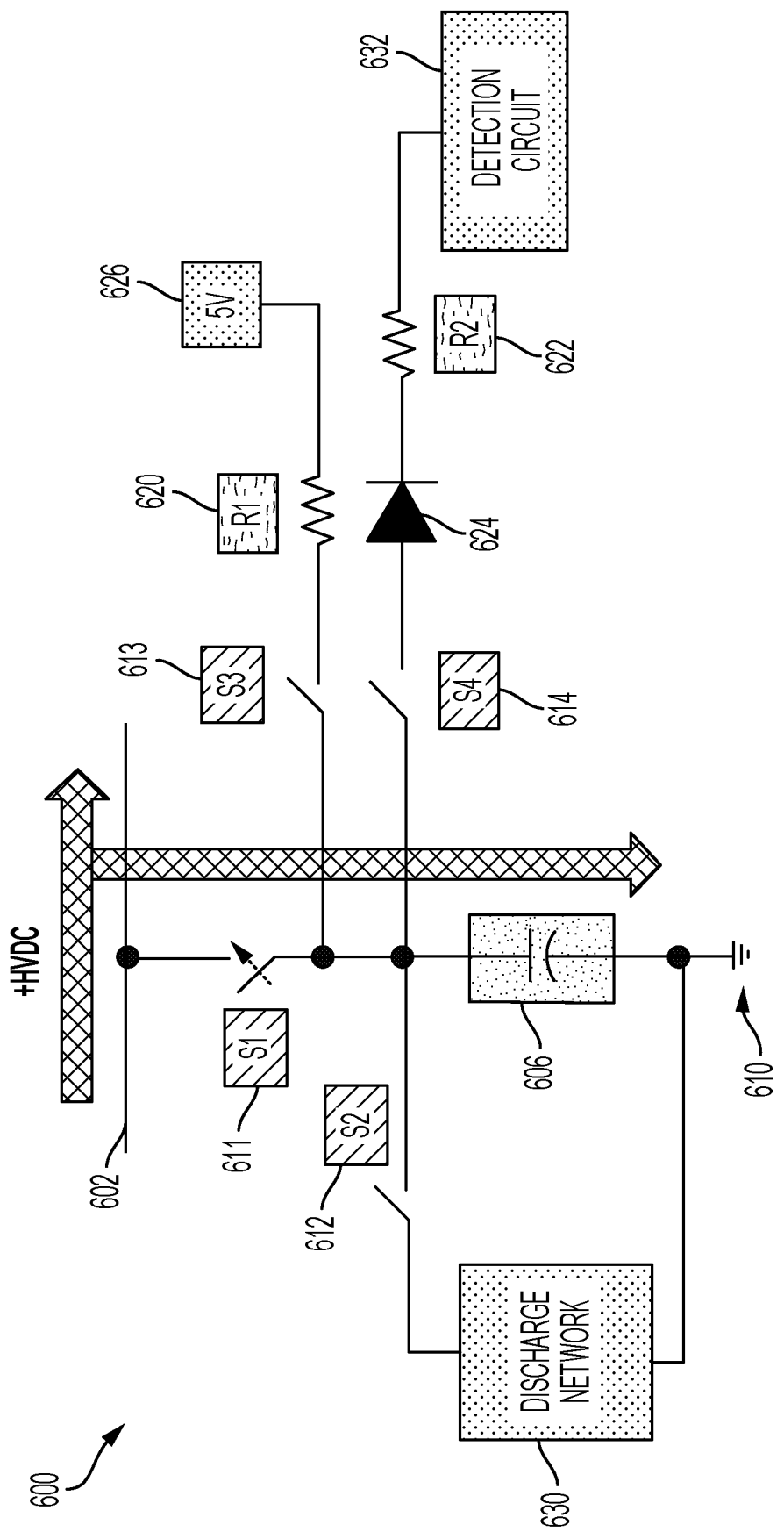
Figure 6C:
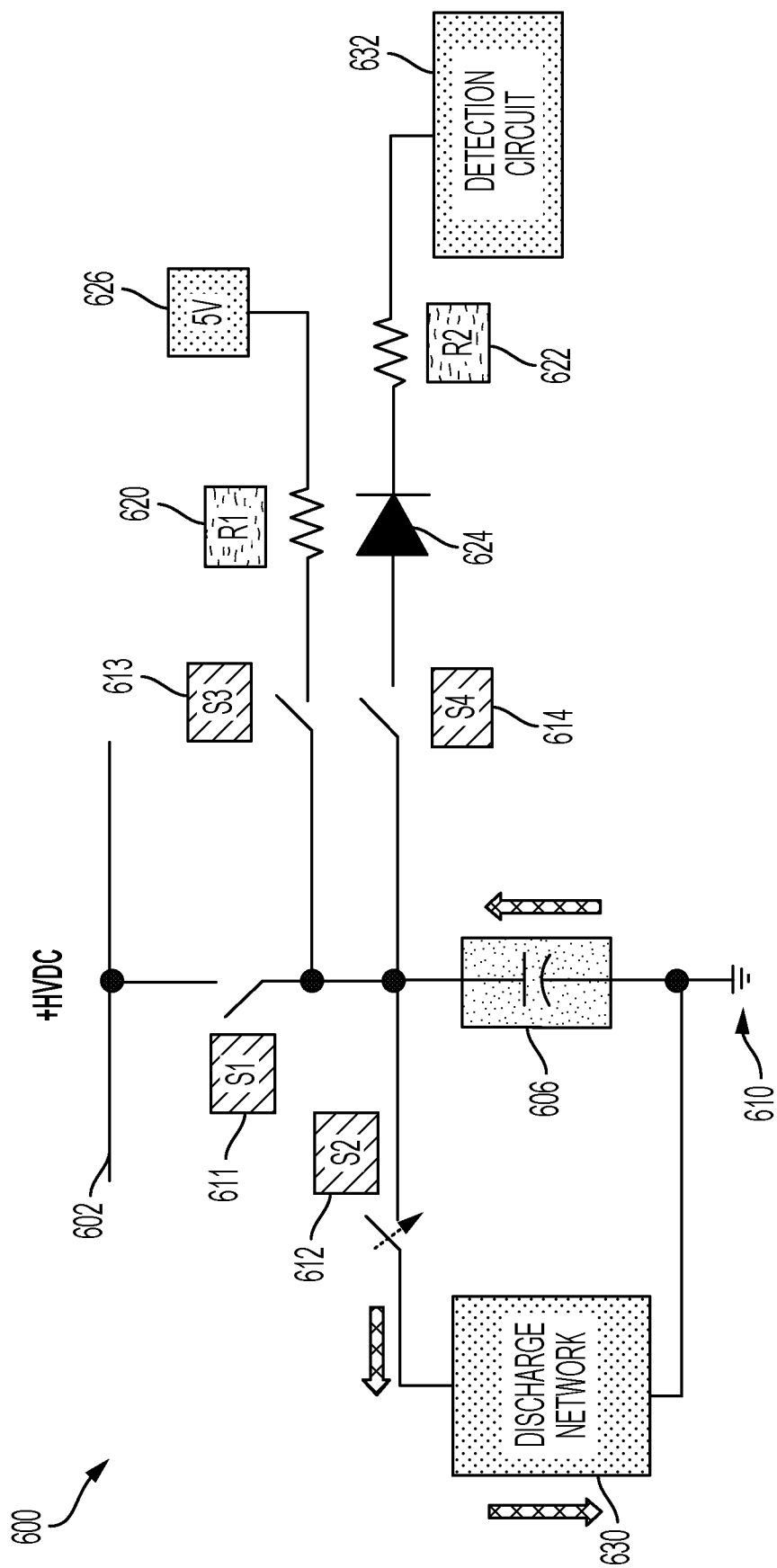
Figure 6D:
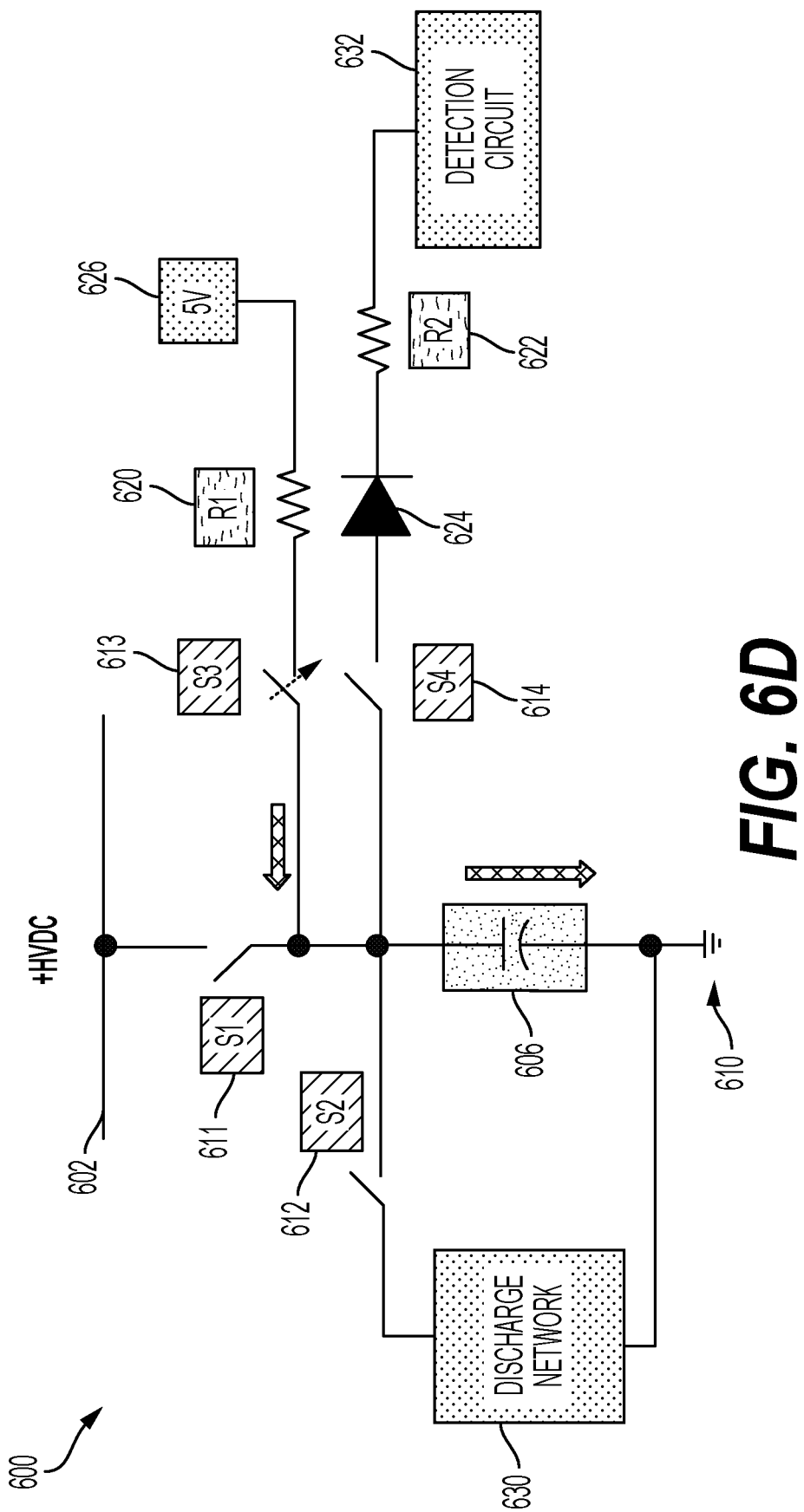
Figure 6E:
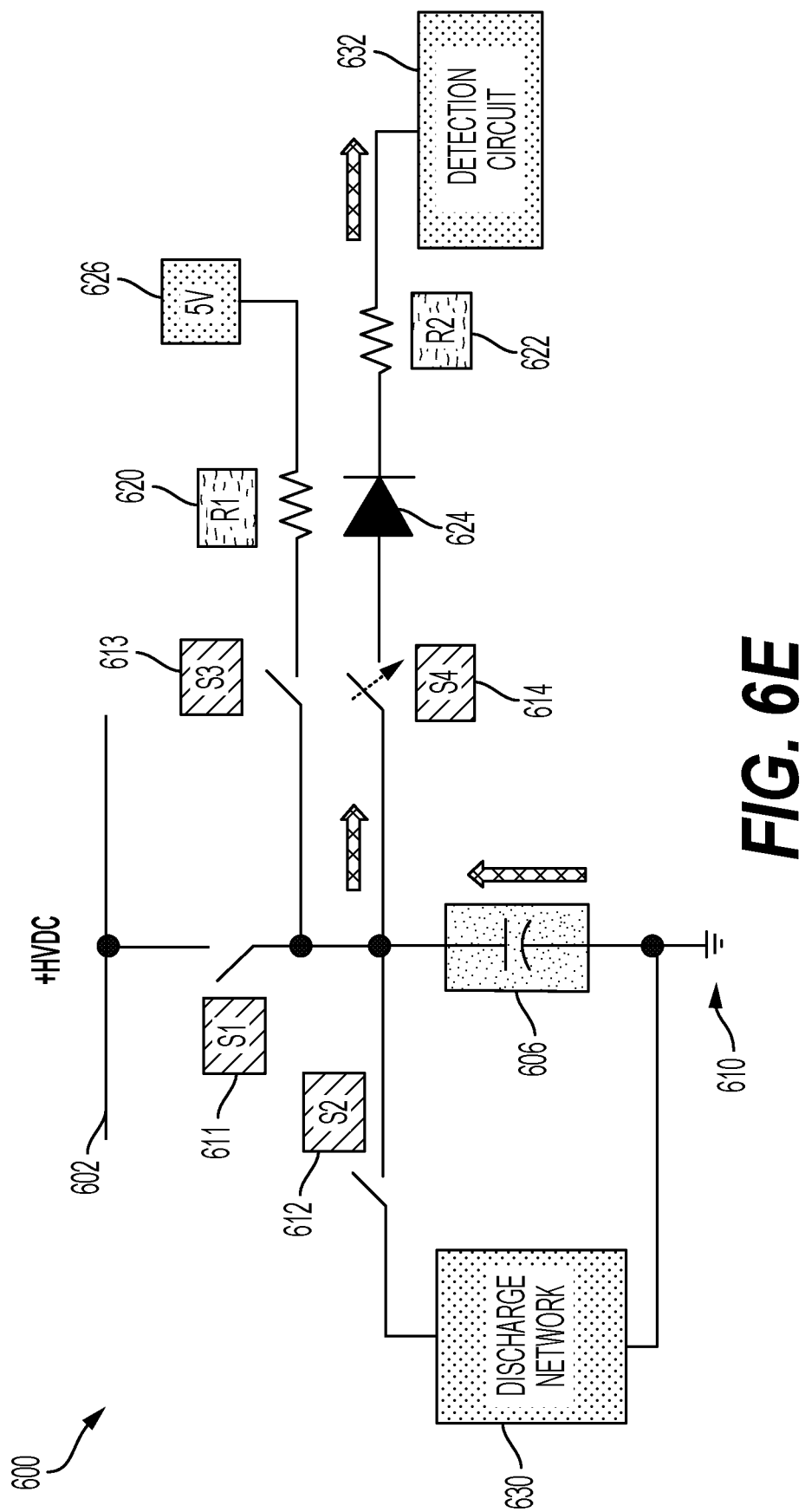

As further explained below, capacitor testing circuit 600 may operate in various modes, or configurations, including open mode, normal mode, and testing mode, for example. Open mode, depicted in FIG. 6A, represents both the main circuit (e.g. positive voltage rail 602 or connecting components of noise filter circuit 500) and the capacitor testing circuit 600 being disconnected from capacitor 606. Normal mode, depicted in FIG. 6B, represents the main circuit being connected to capacitor 606 and the capacitor testing circuit 600 being disconnected from capacitor 606. For example, in normal mode, the noise from positive voltage rail 602 may be discharged through capacitor 606 to ground 610. Different testing phases of testing mode are depicted in FIGS. 6C-6E.

One or more embodiments may operate the testing modes by opening or closing the first switch 611, the second switch 612, the third switch 613, and the fourth switch 614 in various combinations. Different configurations of first switch 611, second switch 612, third switch 613, and fourth switch 614 may connect or disconnect positive voltage rail 602, power source 626, discharge network 630, and/or detection circuit 632 from capacitor 606 as appropriate. An example of a method for testing capacitor 606 is discussed further with respect to FIG. 7.

First switch 611, second switch 612, third switch 613, and fourth switch 614 may be any type of switch. In an example, first switch 611 and second switch 612 may be relays, due to the high voltages and currents being handled. Third switch 613 and fourth switch 614 may serve as respective isolation switches for power source 626 and detection circuit 632. Third switch 613 and fourth switch 614 may be MOSFET switches. Controller 300 may control the operation of first switch 611, second switch 612, third switch 613, and fourth switch 614. Controller 300 may perform testing during startup of a main circuit (e.g., noise filter circuit 500 as depicted in FIG. 5) deployed within a battery charging system (e.g. battery charger 100), and/or on demand.

First switch 611 may be closed to connect capacitor 606 to positive voltage rail 602 and opened to disconnect capacitor 606 from positive voltage rail 602. In some cases, after first switch 611 is closed, controller 300 may impose a delay on any other switch closures to avoid erroneous overlaps. In some applications, such as battery charging, positive voltage rail 602 may represent a high voltage, such as 240 Volts or 400 Volts.

Second switch 612 may be closed to connect capacitor 606 to discharge network 630 and opened to disconnect capacitor 606 from discharge network 630. When connected to capacitor 606, discharge network 630 may dissipate power from capacitor 606 such that capacitor 606 is partially or fully discharged. In some cases, controller 300 may impose a minimum connection time to ensure full discharge of capacitor 606. Non-limiting examples of discharge network 630 may include passive networks, such as those including one or more resistors, and active networks, such as those including MOSFETs. In some cases, an existing discharge network, for example, in the main circuit, may be used in place of discharge network 630.

Third switch 613 may be closed to connect capacitor 606 to power source 626 and opened to disconnect capacitor 606 from power source 626. As depicted, power source 626 may be a 5 Volt power source. However, power source 626 may be any suitable power source, such as a 10 Volt or 20 Volt power source. First resistor 620 may be connected between power source 626 and third switch 613 to pull up the voltage from power source 626. The resistance value of first resistor 620 may be adjusted to manipulate the RC-curve related to charging capacitor 606. For instance, the value of first resistor 620 can be manipulated to ensure a fast charging of capacitor 606. The resistance value of first resistor 620 may be dependent on a capacitance value of capacitor 606.

Fourth switch 614 may be closed to connect capacitor 606 to detection circuit 632 and opened to disconnect capacitor 606 from detection circuit 632. Detection circuit 632 may detect a voltage provided from capacitor 606. Detection circuit 632 may obtain multiple measurements or samples over a period of time.

Detection circuit 632 may be implemented by various devices. For example, detection circuit 632 may include a comparator. Detection circuit 632 may include a controller, such as controller 300, for example. In low voltage applications, e.g., 5 Volt output from power source 626, controller 300 may include an input configured to perform the detection. For example, capacitor 606 may provide a signal directly to a port of a controller, e.g., controller 300, which may measure the signal. In higher voltage applications, additional buffer circuitry may be used.

Diode 624 may ensure that current flows from capacitor 606 to detection circuit 632 in one direction only. Diode 624 may implement peak detection such that detection circuit 632 may detect a peak voltage, e.g., caused by a voltage output from capacitor 606, which may be followed by a discharge curve.

Second resistor 622 may be connected between diode 624 and detection circuit 632. A resistance value of second resistor 622 may be adjusted to modify the threshold of the peak detection. In an example, given a 5 Volt output from power source 626, a resistance value of second resistor 622 may be adjusted such that a detected peak is approximately 4.5 Volts. Controller 300 may adjust a resistance value of second resistor 622 to affect a rate of discharge of capacitor 606. In some cases, the resistance value of second resistor 622 can be adjusted such that a rate of discharge of capacitor 606 is a slow discharge. Detection circuit 632 may include one or more capacitors (not shown) configured to temporarily hold a charge from capacitor 606. Detection circuit 632 may perform measurements of capacitor 606 using the temporarily held charge in the one or more capacitors.

FIG. 6A depicts capacitor testing circuit 600 in an open mode, or configuration. As depicted in FIG. 6A, first switch 611, second switch 612, third switch 613, and fourth switch 614 are each open. In this configuration, capacitor 606 is neither connected to a main circuit, e.g., noise filter circuit 500 depicted in FIG. 5, nor the remainder of capacitor testing circuit 600. In some cases, controller 300 can configure capacitor testing circuit 600 to be in open mode, for instance, when prior to a test taking place.

FIG. 6B depicts capacitor testing circuit 600 in a normal mode, or configuration. In the normal configuration, capacitor 606 is connected to positive voltage rail 602 for normal operation, e.g., battery charging. As depicted in FIG. 6B, during normal mode operation, first switch 611 is closed, and second switch 612, third switch 613, and fourth switch 614 are open. In the normal configuration, capacitor 606 is connected to positive voltage rail 602 and disconnected from capacitor testing circuit 600 (e.g. power source 626, discharge network 630, and detection circuit 632). As depicted in FIG. 5, when first capacitor 506 is connected to positive voltage rail 502 (and thereby to noise filter circuit 500, for example), first capacitor 506 (in conjunction with second capacitor 508) may reduce noise in a system.

FIG. 6C depicts capacitor testing circuit 600 in a discharge phase, or configuration, of capacitor testing. In the discharge phase, capacitor testing circuit 600 may discharge the capacitor 606 using discharge network 630. In transitioning from the normal configuration to the discharge phase, controller 300 may control an operation of first switch 611 from closed to open, thereby disconnecting positive voltage rail 602. In the discharge phase, third switch 613 and fourth switch 614 may remain open. In the discharge phase, controller 300 may control an operation of second switch 612 to be closed, thereby connecting discharge network 630 to capacitor 606. Capacitor testing circuit 600 may remain in the discharge phase for a first time period (e.g. 5 milliseconds) to complete the discharge of capacitor 606. Non-limiting examples of the first time period include 5 milliseconds, 1 to 5 seconds, and 40 to 60 seconds). For instance, in the case that discharge network 630 is a passive discharge network, then the first time period may be 40-60 seconds. By contrast, when discharge network 630 is an active discharge network, then then the first time period may be 1 to 5 seconds. Other examples are possible.

FIG. 6D depicts capacitor testing circuit 600 in a charge phase, or configuration, of a capacitor testing. In the charge phase, controller 300 may control an operation of second switch 612 to be open, and third switch 613 to be closed, such that power source 626 is connected to capacitor 606. In the charge phase, controller 300 may control an operation of first switch 611 and fourth switch 614 to remain open. In the charge phase, controller 300 may control an operation of third switch 613 to be closed for a second time period, e.g., 5 milliseconds, to charge the capacitor 606 to a threshold voltage level. For example, capacitor 606 may be charged to 4.5 or 5 Volts. In this case, to reduce a testing time, a charging voltage of approximately 5 Volts may be used. In this case, a resulting charging time of 5 milliseconds and a resulting detection time of 5 milliseconds can result, with a total testing time of approximately twenty milliseconds. However, the disclosure is not limited thereto. For instance, in some cases, if a higher charge voltage is desired, then third switch 613 is opened for a longer amount of time.

FIG. 6E depicts capacitor testing circuit 600 in a detection phase, or configuration, of a capacitor testing. In the detection phase, controller 300 may control an operation of third switch 613 to be open such that power source 626 is disconnected from capacitor 606, and control an operation of fourth switch 614 to be closed such that detection circuit 632 is connected to capacitor 606. Controller 300 may control an operation of third switch 613 to be open, and subsequent to opening third switch 613, perform a delay before fourth switch 614 is closed. In the detection phase, controller 300 may control an operation of first switch 611 and second switch 612 to remain open. In some examples, the detection phase lasts for a predetermined amount of time (e.g., 5 ms).

During the detection phase, detection circuit 632 measures the output voltage from capacitor 606 one or more times. Based on the detected voltages, controller 300 may determine whether the capacitor 606 is connected (i.e. to first switch 611 and ground 610). For example, when the capacitor 606 is connected, detection circuit 632 may determine the charged voltage of the capacitor 606 to be similar to or lower than the voltage of the power source 626. For example, when the power source 626 is 5 Volts, and the capacitor 606 is connected, then the measured voltage will be approximately 5 Volts. By contrast, when capacitor 606 is disconnected or otherwise faulty, then the measured voltage will be approximately 0 Volts, because capacitor 606 was not charged during the charge phase.

Following the detection phase, controller 300 may control capacitor testing circuit 600 to be configured to the normal phase. As such, controller 300 may control the operation of first switch 611 to be closed, and control the operation of second switch 612, third switch 613, and fourth switch 614 to be open. Controller 300 may control the operation of second switch 612, third switch 613, and fourth switch 614 to be open, and after a delay, control the operation of first switch 611 to be closed, as first switch 611 may introduce a higher voltage (e.g. greater than power source 626 of 5 Volts) into the circuit.

Figure 7:
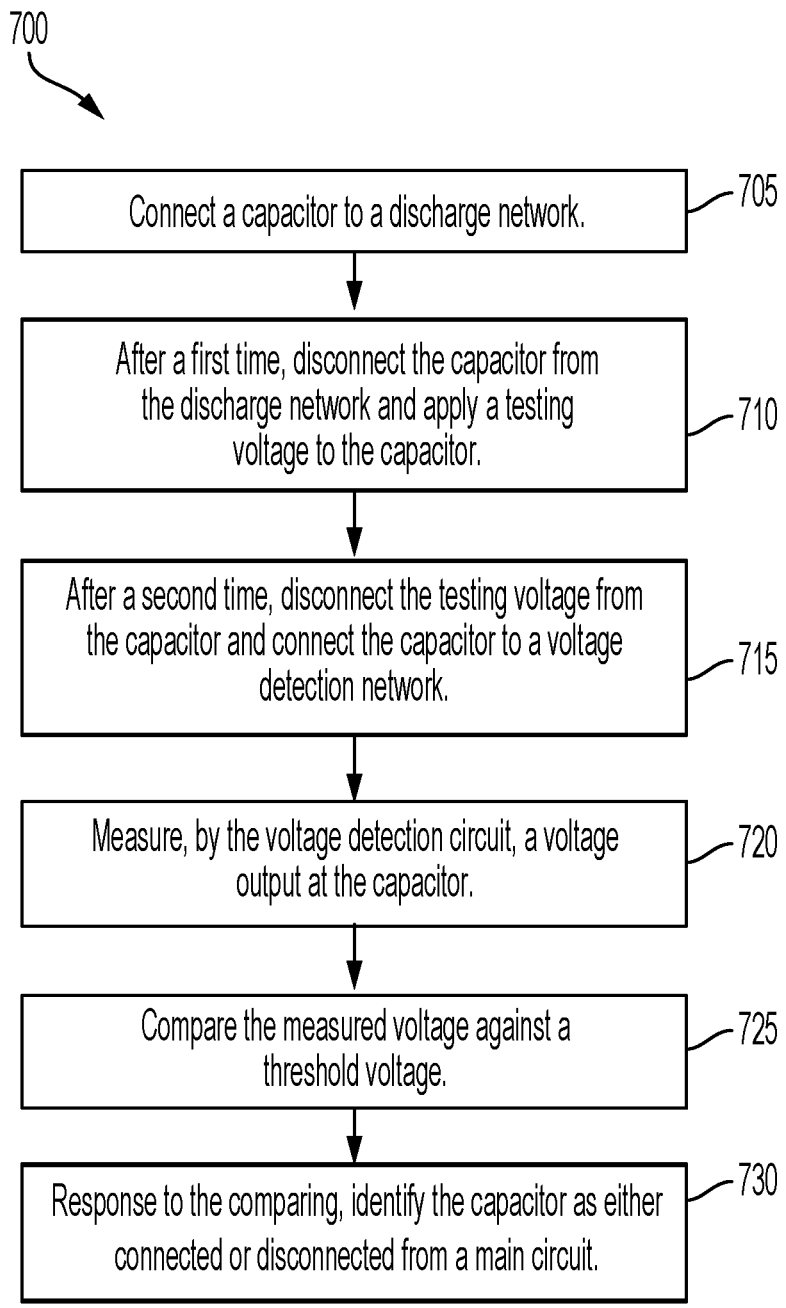
FIG. 7 depicts an exemplary method for testing a capacitor, according to one or more embodiments.

FIG. 7 depicts an exemplary method 700 for testing a capacitor, according to one or more embodiments. For illustrative purposes, method 700 is discussed with respect to capacitor testing circuit 600 controlled by controller 300. However, method 700 could be applied to other capacitor testing circuits and/or use different controllers. While method 700 depicts various operations, not all the operations listed may be performed and/or some operations may be repeated as appropriate.

At block 705, method 700 may involve connecting a capacitor (e.g. capacitor 606) to a discharge network (e.g. discharge network 630). At block 705, controller 300 may configure capacitor testing circuit 600 to be in a discharge phase as depicted in FIG. 6C. For example, controller 300 may connect discharge network 630 to capacitor 606 by controlling first switch 611 to be open, thereby disconnecting positive voltage rail 602, controlling third switch 613 and fourth switch 614 to be open, and controlling second switch 612 to be closed, thereby connecting discharge network 630 to capacitor 606.

At block 710, method 700 may involve, after a first time period following the discharge phase, disconnecting the capacitor (e.g. capacitor 606) from the discharge network (e.g. discharge network 630) and applying a test voltage to the capacitor. The first time period may be set such that the capacitor has sufficient time to discharge to approximately 0 Volts. Then, controller 300 may configure capacitor testing circuit 600 in a charge phase as depicted in FIG. 6D. In the charge phase, controller 300 may control second switch 612 to be open, such that the discharge network 630 is disconnected from the capacitor 606, and control third switch 613 to be closed, such that power source 626 is connected to capacitor 606. In the charge phase, controller 300 may control first switch 611 and fourth switch 614 to remain open.

At block 715, method 700 involves, after a second time period following the charge phase, disconnecting the test voltage from the capacitor (e.g. capacitor 606) and connecting the capacitor to a voltage detection circuit (e.g. detection circuit 632). The second time period may be set such that the capacitor has sufficient time to charge to a test voltage (e.g. approximately 5 Volts). Then, controller 300 may configure capacitor testing circuit 600 in a detection phase as depicted in FIG. 6E. After the second time period, which may be different from the first time period discussed with respect to block 710, controller 300 may control third switch 613 to be open such that power source 626 is disconnected from capacitor 606, and control fourth switch 614 such that detection circuit 632 is connected to capacitor 606. In the detection phase, controller 300 may control first switch 611 and fourth switch 614*be* to be open.

In some cases, at block 715, method 700 may include, after the second time period has elapsed, waiting a third time period before proceeding to block 720, such that the power source 626 is not erroneously maintained in a connected state for an overlapping time as the operations performed at block 720. Accordingly, controller 300 may delay a closure of fourth switch 614 following the opening of third switch 613 as discussed with respect to block 720.

At block 720, method 700 involves measuring, by a voltage detection circuit (e.g. detection circuit 632), an output voltage from the capacitor (e.g. capacitor 606). Method 700 may include obtaining one or more voltage measurements, or samples, of the voltage output from the capacitor (as depicted in FIG. 6E, via fourth switch 614 and/or first resistor 620). Method 700 may include converting the measurements via an analog to digital (A/D) converter (not shown) for processing by controller 300.

In some cases, at block 720, method 700 may include connecting discharge network 630 to capacitor 606 simultaneously with detection circuit 632 by closing second switch 612. However, method 700 may include discharging capacitor 606 via the detection circuit 632 without the discharge network 630 (i.e. opening second switch 612).

At block 725, method 700 may include comparing, by the controller 300, the voltage measurement against a threshold voltage. Different threshold voltages may be used. For example, when power source 626 outputs 5 Volts, then a threshold voltage may be 4.8 Volts. For example, the threshold voltage may be 75% of a test voltage emitted by power source 626.

At block 730, method 700 may include, in response to the comparing, determining that the capacitor (e.g. capacitor 606) is either connected or disconnected from the main circuit (e.g. noise filter circuit 500). When the voltage measurement is less than the threshold voltage, controller 300 may determine that the capacitor is disconnected from the main circuit. Conversely, when one or more of the voltage measurements are above the threshold voltage, controller 300 may determine that the capacitor is connected to the main circuit. In some cases, multiple voltage measurements may be obtained by controller 300. For example, controller 300 may receive a set of voltage measurements of the output voltage of the capacitor over a period of time. From the set of voltage measurements, controller 300 may determine whether the capacitor is connected to the main circuit. For example, when the controller 300 detects the capacitor discharge curve as measured by a decrease in measured output voltage over time, then controller 300 may determine the capacitor to be connected to the main circuit. Such an example is depicted with respect to FIG. 8.

Figure 8:
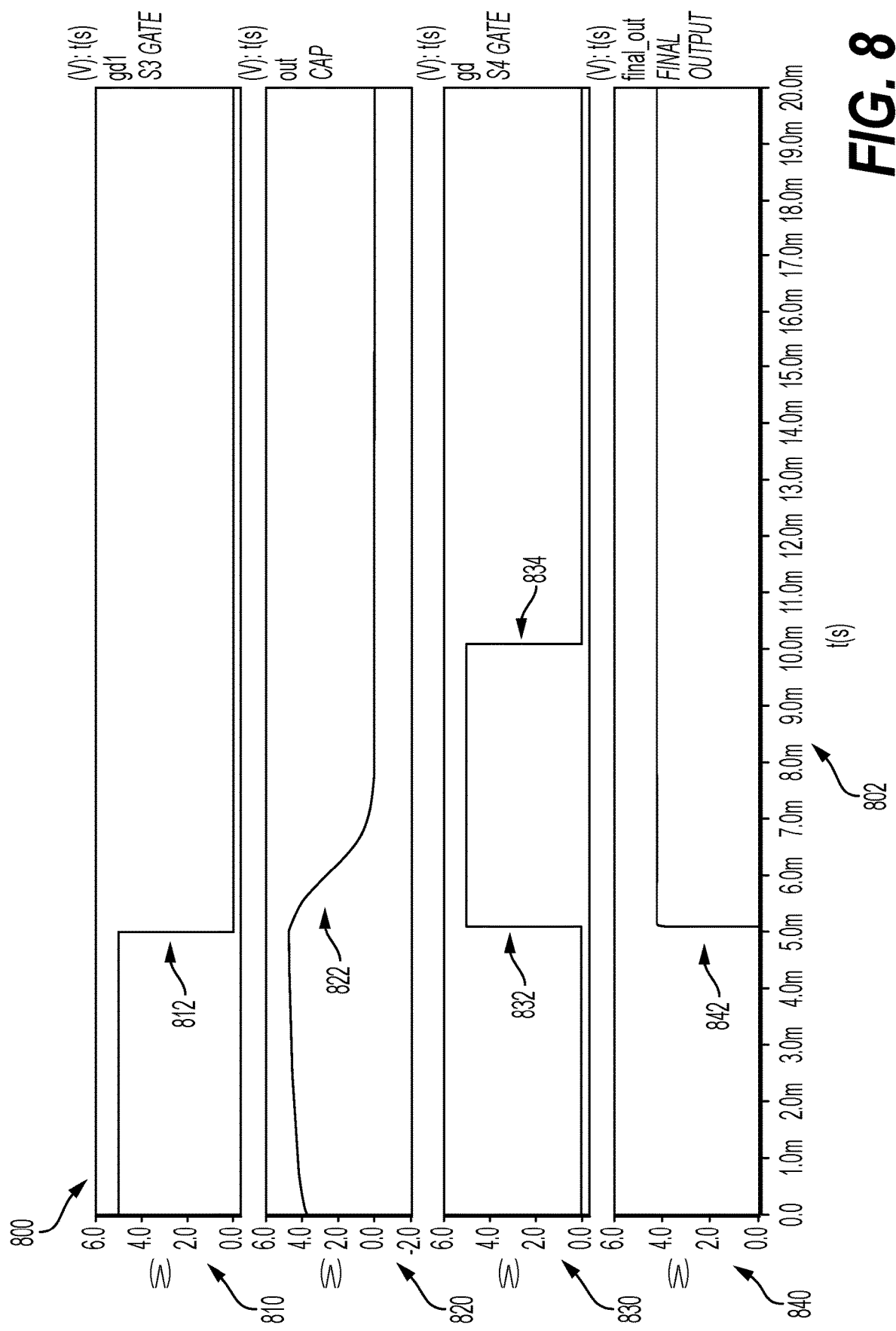
FIG. 8 depicts exemplary plots for various signals in a testing circuit with a capacitor connected, according to one or more embodiments.

FIG. 8 depicts exemplary plots 800 for various signals in a testing circuit with a capacitor connected, according to one or more embodiments. FIG. 8 includes plots 810, 820, 830, and 840. FIG. 8 is discussed with reference to FIGS. 6A-6E. Plot 810 represents a signal indicating whether third switch 613 is open or closed over time 802. A high signal (e.g., 5 volts) indicates that third switch 613 is closed, and a low signal (e.g., 0 Volts) indicates that third switch 613 is open. As depicted in FIG. 8, the signal represented by plot 810 shows third switch 613 transitioning from closed to open at approximately 5 ms. Plot 820 represents a signal measured by the detection circuit 632 over time 802. As depicted in FIG. 8, the signal represented by plot 820 shows a capacitor discharge curve at approximately 5 ms.

Plot 830 represents a signal indicating whether fourth switch 614 is open or closed over time 802. A high signal (e.g., 5 volts) indicates that fourth switch 614 is closed, and a low signal (e.g., 0 Volts) indicates that fourth switch 614 is open. As depicted in FIG. 8, the signal represented by plot 830 shows fourth switch 614 transitioning from open to closed at approximately 5 ms and closed to open at approximately 10 ms. Plot 840 represents a signal presented to an input of detection circuit 632 . . . . A high signal (e.g., 5 Volts) can indicate that the capacitor 606 is connected, and a low signal (e.g., 0 Volts) can indicate that the capacitor 606 is disconnected. As depicted in FIG. 8, the signal represented by plot 840 suggests at approximately 5 ms that capacitor 606 is connected.

As depicted in plots 810, 820, 830, and 840, from approximately 0 ms to approximately 5 ms, third switch 613 is closed. Accordingly, the capacitor testing circuit 600 is operating in the charge phase, as depicted in FIG. 6D, and capacitor 606 is charging. At approximately 5 ms, third switch 613 is opened, as indicated by transition 812, and fourth switch 614 is closed, as indicated by transition 832. These transitions configure capacitor testing circuit 600 in the discharge phase as depicted in FIG. 6E.

From approximately 5 ms to approximately 10 ms, the capacitor 606 is depicted in curve 822 as discharging. One or more voltage measurements may be obtained in this time to determine the initial high voltage (peak) at approximately 5 ms and/or the transition from high to low voltage during the discharge. The signal depicted in plot 840 rises at transition 842, suggesting that a charged, and therefore connected, capacitor is present. At approximately 10 ms, fourth switch 614 is opened, as indicated by transition 834. At this point, testing is complete (and may be repeated as needed).

Figure 9:
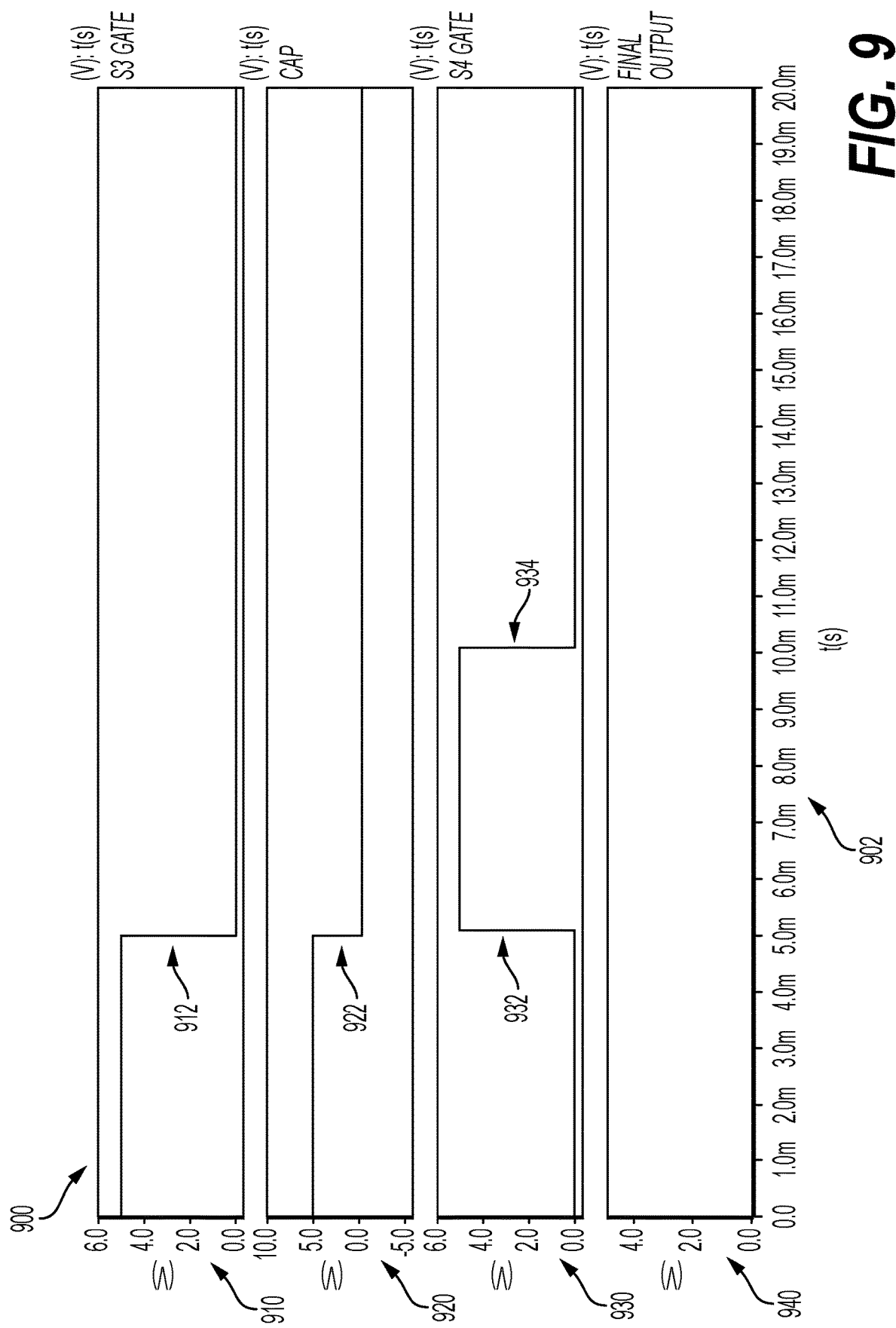
FIG. 9 depicts exemplary plots for various signals in a testing circuit with a capacitor disconnected, according to one or more embodiments.

FIG. 9 depicts exemplary plots 900 for various signals in a testing circuit with a capacitor disconnected, according to one or more embodiments. FIG. 9 includes plots 910, 920, 930, and 940. FIG. 9 is discussed with reference to FIGS. 6A-6E. Plot 910 represents a signal indicating whether third switch 613 is open or closed over time 902. As described for FIG. 8, a high signal indicates that third switch 613 is closed, and a low signal indicates that third switch 613 is open. As depicted in FIG. 9, the signal represented by plot 910 shows third switch 613 transitioning from closed to open at approximately 5 ms. Plot 920 represents a signal measured by the detection circuit 632 over time 902. As depicted in FIG. 9, the signal represented by plot 920 shows a transition 922 from high to low (e.g. approximately 5 Volts to approximately 0 Volts) at approximately 5 ms.

Plot 930 represents a signal indicating whether fourth switch 614 is open or closed over time 902. As described for FIG. 8, a high signal indicates that fourth switch 614 is closed, and a low signal indicates that fourth switch 614 is open. As depicted in FIG. 9, the signal represented by plot 930 shows fourth switch 614 transitioning from open to closed at approximately 5 ms and closed to open at approximately 10 ms. Plot 940 represents a signal presented to an input of detection circuit 632, e.g., from capacitor 606, over time 902. As described for FIG. 8, a high signal (e.g., 5 Volts) can indicate that the capacitor 606 is connected, and a low signal (e.g., 0 Volts) can indicate that the capacitor 606 is disconnected. As depicted in FIG. 9, the signal represented by plot 940 suggests that capacitor 606 is disconnected at all times.

As depicted in plots 910, 920, 930, and 940, from approximately 0 ms to approximately 5 ms, third switch 613 is closed. Accordingly, the capacitor testing circuit 600 is operating in the charge phase, as depicted in FIG. 6D, and a capacitor 606 should be charging from the power source 626.

At approximately 5 ms, third switch 613 is opened, as indicated by transition 912, and fourth switch 614 is closed, as indicated by transition 932. In some cases, third switch 613 is opened following an additional delay to allow third switch 613 to close completely prior to fourth switch 614 being turned on. These transitions configure capacitor testing circuit 600 in the discharge phase as depicted in FIG. 6E. However, as compared to FIG. 8, the measured output from the capacitor 606 of plot 920 shows a sharp transition from high to low voltage at transition 922. This sharp transition is indicative of the charging voltage (e.g., as applied from approximately 0 ms to approximately 5 ms) being removed.

Relative to FIG. 8, plot 920 does not include a slow discharge because capacitor 606 is not connected and/or is not functioning correctly. As such, plot 940 represents a low signal before and after 5 ms. At approximately 10 ms, fourth switch 614 is opened, as indicated by transition 934.

One or more embodiments may be applied to capacitors that are installed in a circuit, such as a battery charger (a "main circuit"), for example. One or more embodiments may provide a testing circuit that may temporarily disrupt a main circuit during testing, and may otherwise allow the main circuit to operate independently from the testing circuit. One or more embodiments may determine whether a capacitor has become disconnected from the main circuit or is otherwise faulty.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   an alternating current (AC) to direct current (DC) converter (AC-DC converter) to receive power;
   a DC to DC converter (DC-DC converter) connected to the AC-DC converter to charge a battery based on the received power;
   a noise filter including a capacitor;
   a testing circuit configured to test the capacitor, the testing circuit including:
      a testing voltage source configured to output a testing voltage to the capacitor;
      a discharge network configured to dissipate power from the capacitor;
      a voltage detection circuit configured to measure a voltage of the capacitor, as a measured voltage;
      a first switch configured to connect the capacitor to a main circuit, wherein the main circuit is configured to operate independently from the testing circuit;
      a second switch configured to connect the capacitor to the discharge network;
      a third switch configured to connect the capacitor to the testing voltage source; and
      a fourth switch configured to connect the capacitor to the voltage detection circuit; and
   one or more controllers configured to (i) control an operation of the first switch, the second switch, the third switch, and the fourth switch to test the capacitor using the testing voltage source, the discharge network, and the voltage detection circuit, and (ii) determine, from the test, whether the capacitor is connected to the noise filter.

2. The system of claim 1, further comprising an electric vehicle including the battery connected to the DC-DC converter.

3. The system of claim 1, wherein the one or more controllers are further configured to:
   close the second switch, thereby connecting the capacitor to the discharge network;
   close the third switch, thereby applying the testing voltage to the capacitor; and
   close the fourth switch, thereby connecting the capacitor to the voltage detection circuit.

4. The system of claim 1, wherein the one or more controllers are further configured to:
   determine that the measured voltage is below a threshold; and
   responsive to determining that the measured voltage is below the threshold, determine that the capacitor is disconnected from the noise filter.

5. The system of claim 1, wherein the one or more controllers are further configured to:
   determine that the measured voltage is above a threshold; and
   responsive to determining that the measured voltage is above the threshold, determine that the capacitor is connected to the noise filter.

6. The system of claim 1, wherein the one or more controllers are configured to close the first switch, thereby connecting the capacitor to the noise filter.

7. The system of claim 1, wherein the one or more controllers are further configured to:
   open the first switch, thereby disconnecting the capacitor from the noise filter; and
   close the second switch, thereby connecting the capacitor to the discharge network.

8. The system of claim 1, wherein the one or more controllers are further configured to:
   open the second switch, thereby disconnecting the capacitor from the discharge network; and
   close the third switch, thereby applying the testing voltage source to the capacitor.

9. The system of claim 1, wherein the one or more controllers are further configured to:
   open the third switch, thereby disconnecting the testing voltage source from the capacitor; and
   close the fourth switch, thereby connecting the capacitor to the voltage detection circuit.

10. A method comprising performing, with one or more controllers, operations including:
    connecting a capacitor to a discharge network;
    after a first time period, disconnecting the capacitor from the discharge network and applying a testing voltage to the capacitor;
    after a second time period, disconnecting the testing voltage from the capacitor and connecting the capacitor to a voltage detection circuit;
    measuring, at the voltage detection circuit, a voltage at the capacitor, as a measured voltage;
    comparing the measured voltage against a threshold voltage; and
    responsive to the comparing, determining whether the capacitor is connected or disconnected.

11. The method of claim 10, wherein the operations further include:
    determining that the capacitor is disconnected when the measured voltage is below the threshold voltage; and
    determining that the capacitor is connected when the measured voltage is above the threshold voltage.

12. The method of claim 10, wherein the operations further include:
    disconnecting the testing voltage; and
    subsequent to disconnecting the testing voltage, delaying the connecting of the capacitor to the voltage detection circuit for a third time period.

13. The method of claim 10, wherein the operations further include:
    receiving, from the voltage detection circuit, a plurality of additional voltage measurements at the capacitor; and
    detecting, based on the plurality of additional voltage measurements, a peak in the voltage at the capacitor.

14. A system comprising:
    a testing circuit configured to test a capacitor, the testing circuit comprising:
       a testing voltage source configured to output a testing voltage to the capacitor;
       a discharge network configured to dissipate power from the capacitor;
       a voltage detection circuit configured to measure a voltage of the capacitor, as a measured voltage;
       a first switch configured to connect the capacitor to a main circuit, wherein the main circuit is configured to operate independently from the testing circuit;
       a second switch configured to connect the capacitor to the discharge network;
       a third switch configured to connect the capacitor to the testing voltage source; and
       a fourth switch configured to connect the capacitor to the voltage detection circuit; and
    one or more controllers configured to (i) control an operation of the first switch, the second switch, the third switch, and the fourth switch to test the capacitor using the testing voltage source, the discharge network, and the voltage detection circuit and (ii) determine, from the measured voltage, whether the capacitor is connected to the testing circuit.

15. The system of claim 14, wherein the one or more controllers are further configured to:
   control the operation of the second switch to be closed, thereby connecting the capacitor to the discharge network;
   control the operation of the third switch to be closed, thereby applying the testing voltage to the capacitor; and
   control the operation of the fourth switch to be closed, thereby connecting the capacitor to the voltage detection circuit.

16. The system of claim 14, wherein the one or more controllers are further configured to:
   determine that the measured voltage is below a threshold; and
   responsive to the determining that the measured voltage is below the threshold, determine that the capacitor is disconnected.

17. The system of claim 14, wherein the one or more controllers are further configured to:
   determine that the measured voltage is above a threshold; and
   responsive to the determining that the measured voltage is above the threshold, determine that the capacitor is connected.

18. The system of claim 14, wherein the one or more controllers are further configured to control the operation of the first switch to be closed, thereby connecting the capacitor to the main circuit.

19. The system of claim 14, wherein the one or more controllers are further configured to:
   control the operation of the first switch to be open, thereby disconnecting the capacitor from the main circuit;
   control the operation of the second switch to be closed, thereby applying the capacitor to the discharge network;
   control the operation of the second switch to be open, thereby disconnecting the capacitor from the discharge network;
   control the operation of the third switch to be closed, thereby applying the testing voltage source to the capacitor;
   control the operation of the third switch to be closed, thereby disconnecting the testing voltage source from the capacitor; and
   control the operation of the fourth switch to be closed, thereby connecting the capacitor to the voltage detection circuit.

20. The system of claim 14, further comprising:
   a first resistor connected between the third switch and the testing voltage source;
   a diode connected to the fourth switch; and
   a second resistor connected between the fourth switch and the voltage detection circuit.

\* \* \* \* \*